United States Patent [19]

Golden et al.

[11] 4,348,356

[45] Sep. 7, 1982

[54] REACTOR VESSEL SUPPORT SYSTEM

[75] Inventors: Martin P. Golden, Trafford; John C. Holley, McKeesport, both of Pa.

[73] Assignee: The United States of America as represented by the United States Department of Energy, Washington, D.C.

[21] Appl. No.: 148,323

[22] Filed: May 9, 1980

[51] Int. Cl.³ ............................................. G21C 13/00
[52] U.S. Cl. .................................... 376/461; 376/203; 414/146
[58] Field of Search .................... 176/30, 87; 414/146; 376/203, 461

[56] References Cited

U.S. PATENT DOCUMENTS

| | | | |
|---|---|---|---|
| 4,026,763 | 5/1977 | Poindexter | 176/87 |
| 4,078,968 | 3/1978 | Golden | 176/87 |
| 4,078,969 | 3/1978 | Garin | 176/87 |
| 4,135,973 | 1/1979 | Golden | 176/87 |
| 4,181,572 | 1/1980 | Wade | 176/87 |

*Primary Examiner*—Donald P. Walsh
*Attorney, Agent, or Firm*—Hugh W. Glenn; Robert J. Fisher; Richard G. Besha

[57] ABSTRACT

A reactor vessel support system includes a support ring at the reactor top supported through a box ring on a ledge of the reactor containment. The box ring includes an annular space in the center of its cross-section to reduce heat flow and is keyed to the support ledge to transmit seismic forces from the reactor vessel to the containment structure. A coolant channel is provided at the outside circumference of the support ring to supply coolant gas through the keyways to channels between the reactor vessel and support ledge into the containment space.

7 Claims, 4 Drawing Figures

REACTOR VESSEL SUPPORT SYSTEM

CONTRACTUAL ORIGIN OF THE INVENTION

The U.S. government has rights in this invention pursuant to Contract No. EY-76-C-15-2395 between the U.S. Department of Energy and Westinghouse Electric Corporation.

BACKGROUND OF THE INVENTION

This invention relates to a support system for a nuclear reactor vessel or other similar type large vessel. The support system includes provisions for transmitting seismic loads for limiting heat flow from the vessel and for sealing inert cover gas in the reactor system. It particularly relates to a support system for a loop type, liquid-metal-cooled nuclear reactor. In such a reactor system, the primary heat exchanger is connected by primary loop piping to a double-walled reactor vessel. A containment enclosure is provided around the primary loop piping and includes both the primary heat exchanger and the double-walled reactor vessel. This type liquid-metal-cooled reactor is in contrast to pool-type reactors in which both the reactor vessel and primary heat exchanger are submerged within a reservoir or pool of the liquid metal coolant.

Present commercial nuclear reactors using pressurized water coolant are most often supported on heavy pads which are made intregal with the reactor vessel coolant nozzles. The nozzles are often located away from the reactor top and are sufficiently large and strong for this purpose. This design is unsuitable for loop-type liquid-metal-cooled reactor vessels that operate at substantially higher temperatures and as stated above are double-walled vessels contained within a second enclosure surrounding the primary heat exchanger loop.

Therefore, in view of the above it is an object of the present invention to provide a reactor vessel support system for use with a liquid-metal-cooled nuclear reactor.

It is a further object to provide a reactor vessel support system that limits heat flow from the vessel.

It is a further object to provide a reactor vessel support system that includes a sealing arrangement for inert cover gases.

It is also an object to provide such a reactor vessel support system capable of transmitting horizontal seismic loads from the reactor to the support structure.

SUMMARY OF THE INVENTION

The support system for a nuclear reactor includes a box ring defining an annular space disposed between the reactor vessel support ring and a support ledge forming part of the containment structure. Radial keys are provided at the top and bottom of the box ring to cooperate with corresponding keyways in the bottom of the reactor vessel support ring and in the top of the support ledge. This box ring structure transmits seismic forces but yet reduces heat flow between the reactor vessel and its supporting containment structure.

In a more specific aspect, a coolant channel is provided between the reactor vessel support ring and the containment structure to further reduce heat flow from the reactor vessel. A header disposed just outside the support ring supplies inert gas to this coolant channel.

DESCRIPTION OF THE PREFERRED EMBODIMENT

Figure 1:
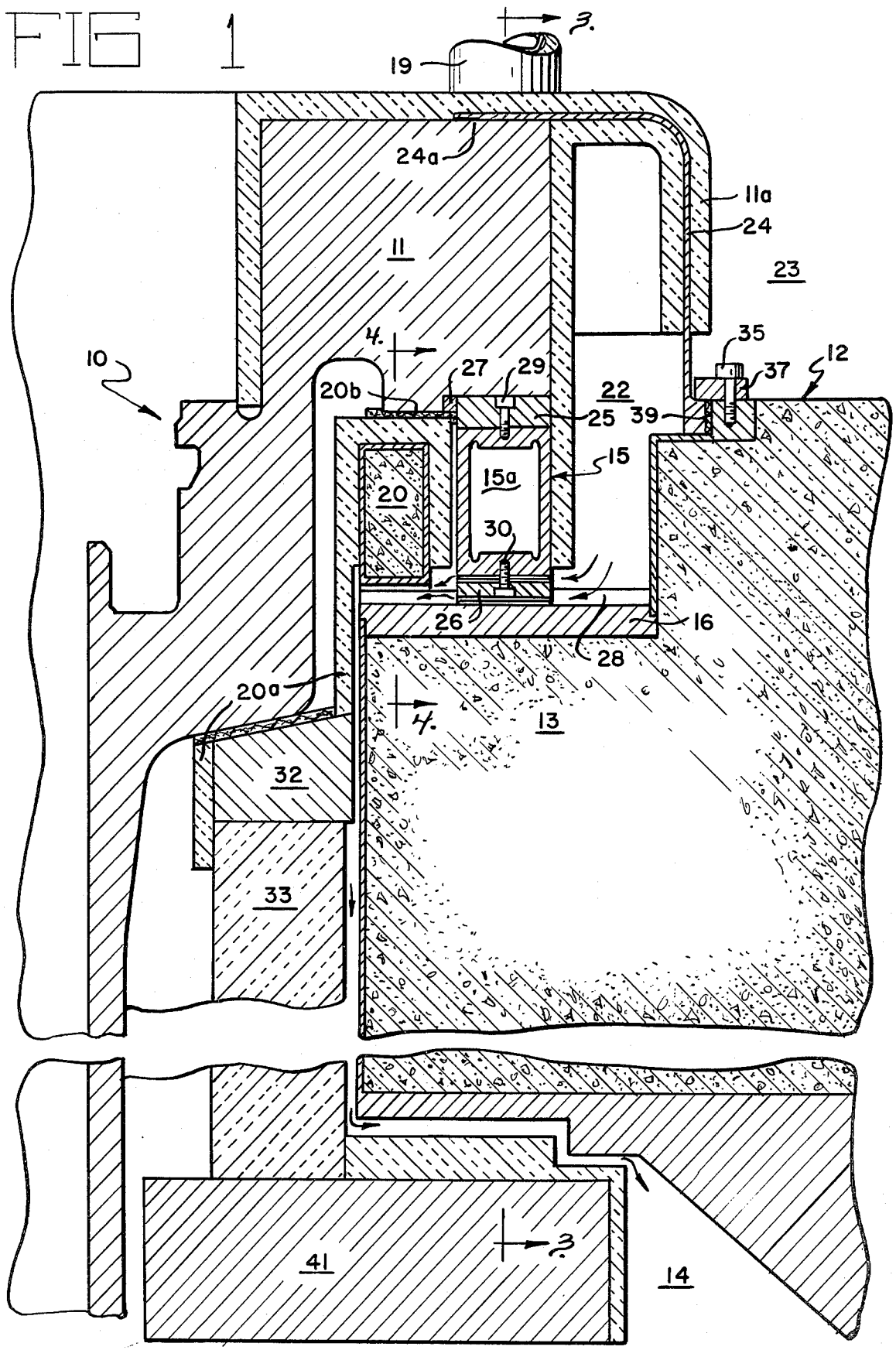
FIG. 1 is a vertical section taken on the line 1—1 of FIG. 2 showing the support structure for a reactor vessel according to the present invention.
Figure 2:
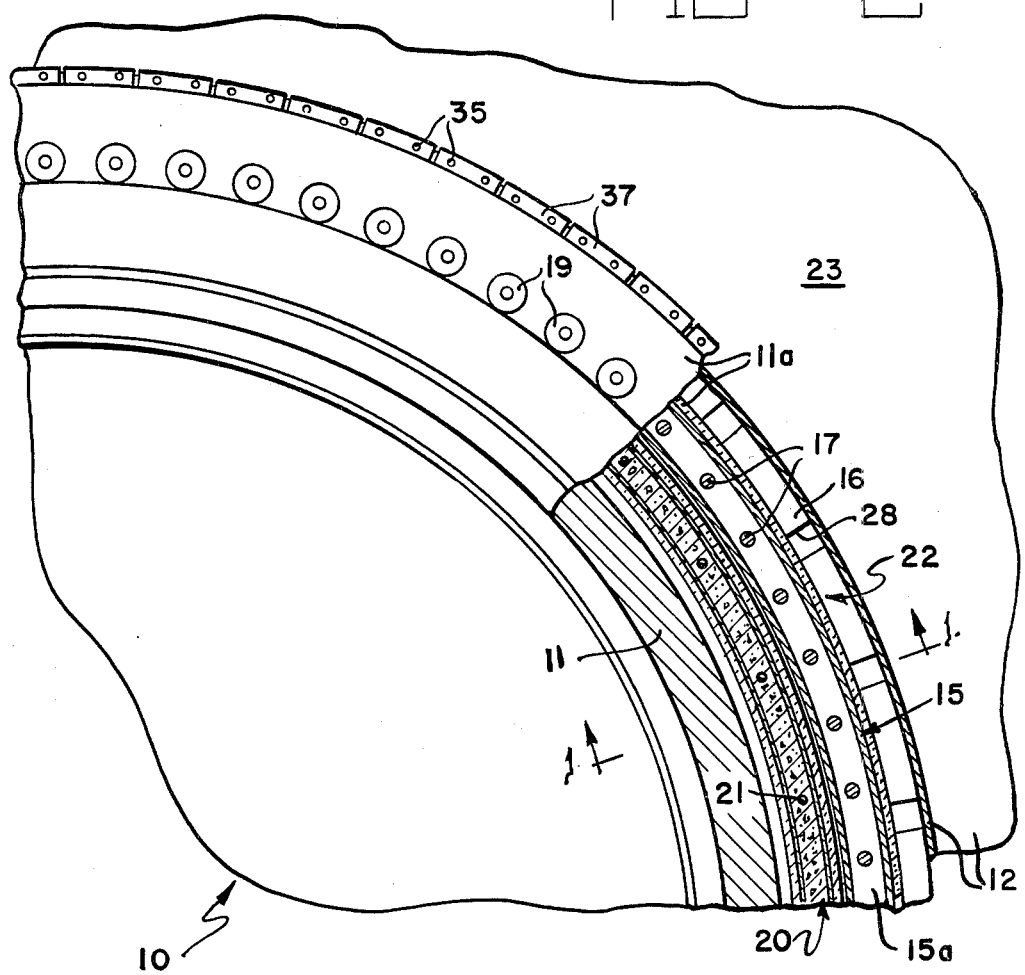
FIG. 2 is a top view partly in section thereof.

Referring to the drawing a nuclear reactor vessel 10—which houses a nuclear reactor core (not shown)—is provided with an outwardly extending support ring 11 at the top thereof. The support ring 11 and other outward portions of the reactor system are shown generally covered by thermal insulation 11a such as alumina-silica type. The containment structure 12 for the reactor includes an integral support ledge 13 extending inwardly therefrom into reactor vessel cavity 14. Cavity 14 in addition to reactor vessel 10 can also contain the primary heat exchanger and primary liquid metal coolant loop in a liquid-metal-cooled reactor system. Reactor vessel 10 typically includes double walls (not shown) in a liquid-metal-cooled fast breeder reactor system, which makes ordinary support arrangements integral with coolant nozzles difficult or impractical to employ.

Figure 3:
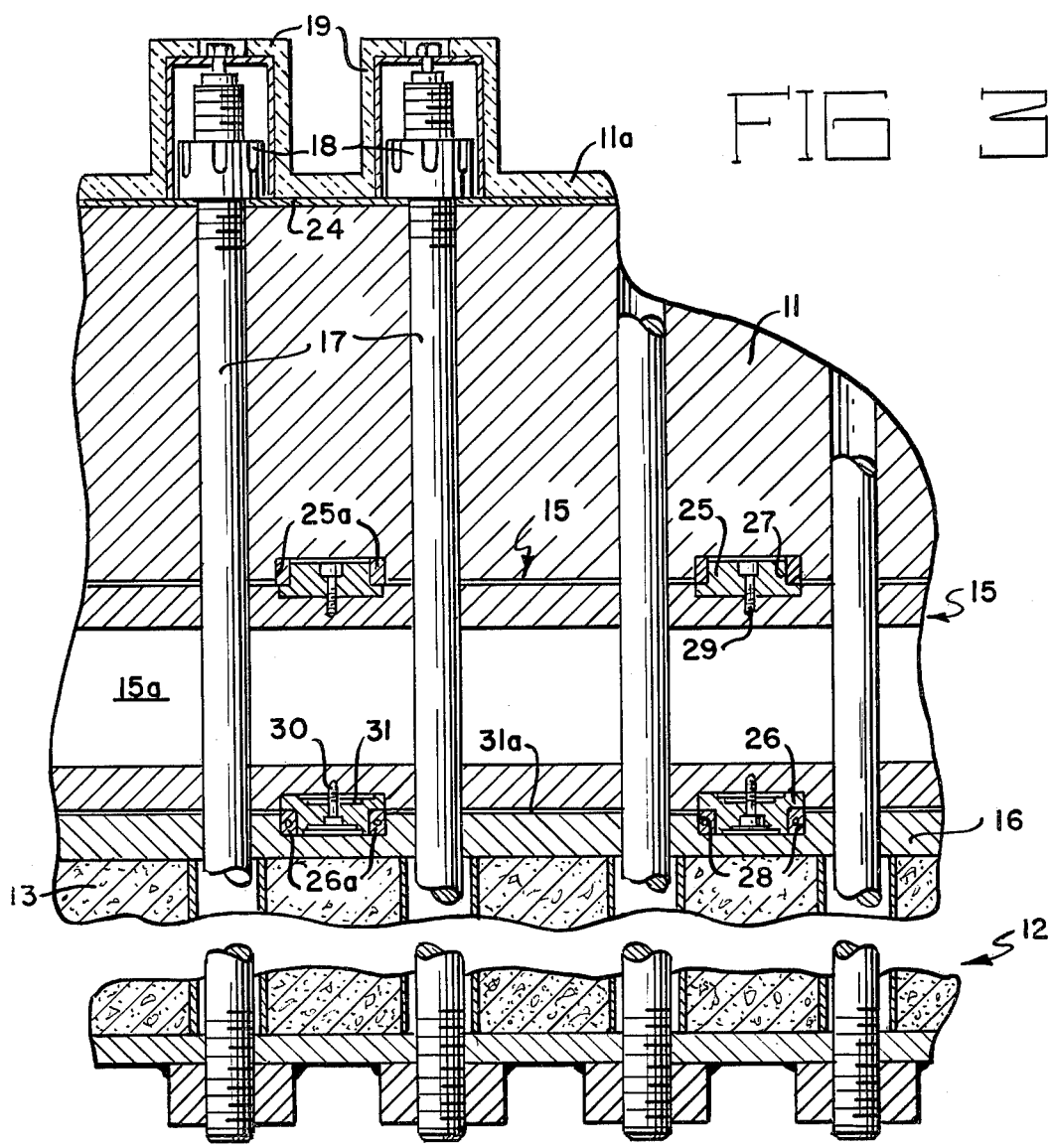
FIG. 3 is a section taken on the line 3—3 in FIG. 1.

Interposed between support ring 11 and support ledge 13 is a box ring 15 which is shown resting on a top plate 16 of the support ledge 13. Although the box ring 15 carries the weight of support ring 11 and thus that of reactor vessel 10, it also defines an annular space 15a to limit heat flow between the reactor and its containment. Support ring 11 is fastened to support ledge 13 by hold-down studs 17 (see FIG. 3) which extend through box ring 15 and ledge 13. The studs, at the top, are provided with nuts 18 enclosed within seal caps 19 which in cooperation with suitable gaskets seal the stud hole leakage path.

The containment structure 12 and integral ledge 13 are illustrated as being of concrete and ledge 13 is shown with a metal top plate 16, however, it will be clear that other suitable materials and arrangements can be used. For instance, the complete thickness of ledge 13 may be of suitably strong steel or other metal securely and integrally fastened into the containment structure. Similarly studs 17 are shown as preferable extending through the support ring 11 and the support ledge 13, but other appropriate arrangements involving suitably anchored studs might also be devised to meet various design conditions.

Upper and lower radial keys 25 and 26 (see FIG. 3) respectively transmit horizontal seismic loads from the reactor vessel through the box ring 15 to the support ledge 13. Mating keyways 27 and 28 respectively are machined in the bottom of the reactor vessel support ring and in the top plate of the support ledge. Upper and lower keys 25 and 26 are fastened to the box ring 15 by screws 29 and 30 respectively. Tapered wedges 25a and 26a provide metal to metal fit between the upper and lower keys 25 and 26 respectively and their associated keyways 27 and 28.

Figure 4:
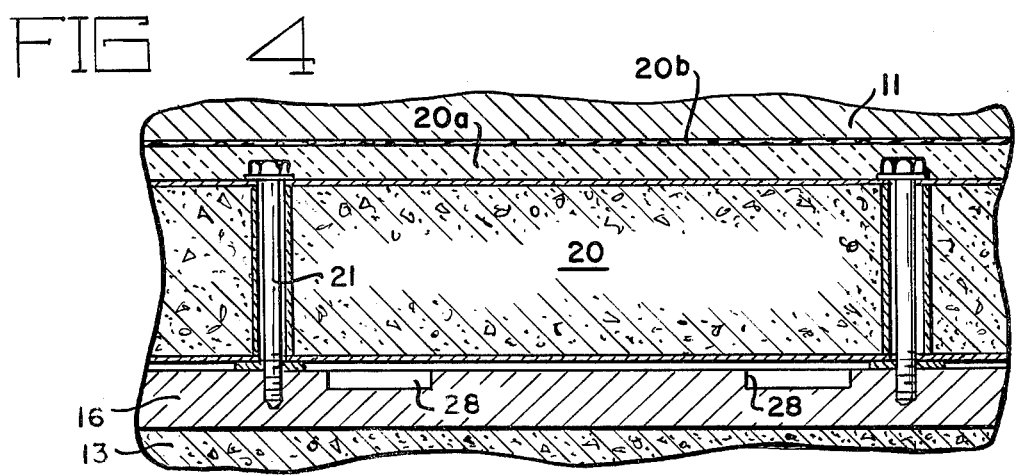
FIG. 4 is a section taken on the line 4—4 in FIG. 1.

Located between box ring 15 and reactor vessel 10 is a shield ring 20 (FIG. 4) tied to top plate 16 of support ledge 13 by bolts 21. The shield ring is a generally non-loaded member of suitable material such as concrete surrounded by thermal insulation 20a. A flat ring of crushable sealing material 20b seals between the insulation 20a and the reactor vessel support ring 11.

A cooling gas header 22 separated from the reactor head access area 23 by seal collar 24 surrounds support ring 11 and box ring 15. Seal collar 24 is a ring of metal plate with angular cross section having a horizontal flange over the a portion of the support ring 11 and a vertical flange engaging the containment 12. The seal collar 24 is bolted to the top of reactor vessel support ring 11 by studs 17 and is generally covered on both sides by thermal insulation 11a.

The seal collar 24 in combination with seal caps 19 also provide a seal between the reactor cavity 14 which is under an inert gas cover and the head access area 23 which normally has an air atmosphere. The inert gas may be nitrogen or air with most of the oxygen removed. The seal collar 24 is sealed at its horizontal flange edge to the reactor vessel support ring 11 by a seal 24a of such as graphite-type material in tape form. At the edge of its vertical flange it is bolted and sealed to the containment structure 12 by a suitable arrangement such as bolts 35 holddown clampblock 37 and a suitable seal 39 as shown.

One or more supply headers (not shown) bring cooling gas across the floor of the head access area 23 to cooling header 22. Nitrogen or other inert gas from cooling gas header 22 flows through slots 31 (FIG. 3) in lower radial keys 26, and in gaps 31a left between the bottom of the box ring and the top of the support ledge. This gas flow limits the heat flow from the reactor vessel through the box ring support to the concrete support ledge so that its temperature remains below specified limits. The gas then flows in keyways 28 (FIG. 4) under shield ring 20 and then downward past steel shield ring 32 and insulation 33 on the inside diameter of the support ledge 13. The gas then flows radially outwardly between the bottom of the support ledge and shield collar 41 into reactor vessel cavity 14. Thus, the support ledge is cooled without having cooling headers and lines installed in its structure.

In one particular application box ring 15 is a ring about 322" outside diameter, about 8" thick, and about 15" deep with a box type cross-section defining an annular space 15a. The top and bottom of the box are about 3" thick low alloy steel. The relatively thin (about 1" thick) inside and outside cylindrical side walls shown in the box cross-sections are Inconel 600 which has relatively low thermal conductivity. The box structure with its annular space 15a limits the heat flow from the reactor vessel to the support ledge to within acceptable limits.

It is thus seen that the present invention provides a reactor support system that is particularly well suited for supporting loop type, liquid-metal-cooled reactors. The support includes a sealing arrangement for containing an inert cover gas within the reactor containment providing additional security against undesirable reactions between reactive alkali metal coolants such as sodium or sodium-potassium alloy with the air atmosphere of the head access area. The support system also effectively transmits horizontal seismic loads between the vessel and the supporting structure. An annular box ring arrangement limits the flow of heat from the high temperature, liquid-metal-cooled reactor to the supporting structure of the containment.

Although the present invention has been described in terms of specific embodiments, it will be clear that variations in structure, materials and methods will occur to those skilled in the art within the scope of the following claims.

We claim:

1. In a nuclear reactor vessel support system including a nuclear reactor vessel having an outwardly extending support ring, a nuclear reactor containment structure surrounding the vessel, the containment structure having an inwardly extending support ledge aligned with and attached to the support ring whereby the vessel weight is transmitted to the support ledge, the improvement comprising a box ring interposed in load bearing relationship directly between the support ring and support ledge to transmit the vessel weight from the support ring to the support ledge, said box ring having rigid cylindrical side walls and flat rigid ring-shaped upper and lower walls to enclose and define an annular space directly between the support ledge and the support ring to limit heat flow therebetween.

2. The improvement of claim 1 wherein the top and bottom of the box ring are low alloy steel and the side walls thereof are of relatively thin Inconel.

3. The improvement of claim 1 including radial keys in the top and bottom of the box ring and mating keyways in the bottom of the reactor vessel support ring and in the top plate of the reactor vessel support ledge.

4. The improvement of claim 1 wherein holddown bolts are provided that extend through said support ring and support ledge.

5. The improvement of claim 1 including a coolant header defined by a seal collar spaced from the outside edge of the support ring and a coolant channel extending from the coolant header to the reactor containment cavity between the reactor vessel and the support ledge.

6. The improvement of claim 5 wherein said seal collar comprises a ring of metal plate having an angular cross-section with a horizontal and a vertical flange, said horizontal flange outer edge in sealing engagement with said support ring and said vertical flange outer edge in sealing engagement with said reactor containment.

7. The improvement of claim 5 wherein a plurality of radial keyways commuting with said coolant header are provided in the top surface of said support ledge for receiving radial keys also in keyway engagement with said box rings, said keys including channels in alignment with said keyway for passing coolant flow.

* * * * *